US005403422A

United States Patent [19]

Kawai et al.

[11] Patent Number: 5,403,422

[45] Date of Patent: Apr. 4, 1995

[54] METHOD FOR PRODUCING DECORATIVE PLATES

[75] Inventors: Akira Kawai; Hajime Kubota; Seiji Kawahara, all of Tokyo, Japan

[73] Assignee: Dai Nippon Printing Co., Ltd., Tokyo, Japan

[21] Appl. No.: 232,592

[22] Filed: Apr. 25, 1994

Related U.S. Application Data

[63] Continuation of Ser. No. 809,379, Dec. 18, 1991, abandoned.

[51] Int. Cl.[6] .......................... B32B 19/00; B32B 21/00

[52] U.S. Cl. .................................... 156/240; 156/235; 156/307.3; 156/307.5; 156/234

[58] Field of Search ............... 158/235, 234, 239, 240, 158/307.3, 307.5

[56] References Cited

U.S. PATENT DOCUMENTS

| | | | |
|---|---|---|---|
| 2,639,253 | 5/1953 | Reese | 156/240 |
| 3,912,569 | 10/1975 | Kapral | 156/240 |
| 4,765,858 | 8/1988 | Vankerckhoven | 156/240 X |
| 4,869,957 | 9/1989 | Vankerckhoven | 428/352 X |
| 4,971,854 | 11/1990 | Hinishi | 428/195 X |
| 5,019,440 | 5/1991 | Ogasawara | 428/195 X |

FOREIGN PATENT DOCUMENTS

| | | | |
|---|---|---|---|
| 3709229 | 9/1988 | Germany . | |
| 3730051 | 12/1988 | Germany . | |
| 3741368 | 12/1988 | Germany . | |
| 3925451 | 9/1990 | Germany . | |
| 3916099 | 11/1990 | Germany . | |
| 3932139 | 4/1991 | Germany . | |
| 0090396 | 7/1980 | Japan | 156/240 |
| 0011255 | 2/1981 | Japan | 156/295 |
| 0220735 | 12/1983 | Japan | 156/240 |
| 3071337 | 3/1988 | Japan | 156/240 |
| 2145628 | 6/1990 | Japan | 156/307.3 |
| 0028105 | 7/1992 | Japan | 156/307.3 |

*Primary Examiner*—David A. Simmons
*Assistant Examiner*—Charles Rainwater
*Attorney, Agent, or Firm*—Foley & Lardner

[57] ABSTRACT

A method for producing decorative plates, comprising the steps of (i) providing a transfer printing sheet which comprises (a) a substrate film comprising a synthetic resin, (b) a releasing layer formed, optionally, on the substrate film, (c) a pattern layer formed on the substrate film or on the releasing layer if it is provided, and (d) an adhesive layer formed on the pattern layer, (ii) superposing the transfer printing sheet on a base sheet, (iii) hot-pressing the transfer printing sheet and the base sheet, (iv) peeling the substrate film off the transfer printing sheet thereby to transfer the pattern layer on the base sheet, (v) impregnating the base sheet with a thermosetting resin, and (vi) hot-pressing the resulting base sheet to harden the thermosetting resin to give a decorative plate.

4 Claims, No Drawings

METHOD FOR PRODUCING DECORATIVE PLATES

This application is a continuation of U.S. application Ser. No. 07/809,379, filed Dec. 18, 1991, abandoned.

BACKGROUND OF THE INVENTION

The present invention relates to decorative plates which are used as building materials and interior use materials, and more particularly to a method for producing thermoset-resin surfaced decorative plates such as a melamine surfaced decorative plate, a polyester surfaced decorative plate, a DAP surfaced decorative plate, an epoxy surfaced decorative plate and a guanamine surfaced decorative plate.

Thermoset-resin surfaced decorative plates are suitable for use as wall- materials, flooring materials, and materials for household furniture, kitchen fixtures and the like, which are required to have high strength and high resistance to heat. Decorative plates of this type are, in general, produced by printing a pattern on a porous base sheet by means of gravure printing, offset printing or the like, impregnating the base sheet with a thermosetting resin, and hot-pressing the resulting base sheet to harden the thermosetting resin.

Titanium-containing paper has been used as the porous base sheet of the above conventional decorative plates. In order to ensure thorough penetration of a resin into the base sheet, the gas permeability of the base sheet is made low, and a tangle of pulp fiber which composes the base sheet is made rough. Moreover, a large amount of titanium white or a coloring pigment is employed when the paper (base sheet) is made. However, such a porous base sheet is inferior in the printability to a paper such as coated paper or art paper. A pattern therefore cannot be printed on the base sheet with sufficiently high reproducibility, and numerous fine non-printed portions are produced in a pattern-printed area. Furthermore, an ink cannot be stably transferred to the base sheet, so that it is difficult to uniformly control the quality of the product. Printing methods of the above type are disclosed in Japanese Patent Publications Nos. 4540/1951 and 7737/1959.

In the case where a pattern cannot be easily printed on a base sheet, a transfer printing technique may be utilized. According to this technique, a pattern layer is transferred to a base sheet with the aid of an adhesive layer. For instance, Japanese Patent Publication No. 22732/1963 and Japanese Laid-Open Patent Publication No. 148662/1984 disclose a method for producing decorative plates utilizing the transfer printing technique. In this method, a transfer printing sheet containing a grain-pattern layer is superposed on a base sheet which has been impregnated with a resin in advance, the transfer printing sheet and the base sheet are then hot-pressed, and the transfer printing sheet is finally peeled off from the base sheet to give a decorative plate having the wood-grain pattern.

However, the above method for producing decorative plates utilizing the transfer printing technique is not a perfect one. One of the reasons is that the pattern layer cannot firmly be adhered to the base sheet impregnated with a resin when the pattern layer (a wood-grain pattern) is transferred to the base sheet. In the case where a base sheet to which the pattern layer can firmly adhere is employed, the resin cannot be thoroughly penetrated into the base sheet. More specifically, in the above-described conventional method, after a porous base sheet is impregnated with a resin, a transfer printing sheet is superposed on the base sheet. The transfer printing sheet and the base sheet are then hot-pressed so that the resin contained in the base sheet can be penetrated into the pattern layer. The base sheet and the pattern layer are thus joined by the resin into one. However, we have found that when a thick and dense adhesive layer is used in order to firmly adhere the pattern layer to the surface of the base sheet, the resin cannot be uniformly penetrated into the pattern layer in the above joining process. As a result, the yield of the product is lowered. On the other hand, when a thin and coarse adhesive layer is used to ensure thorough penetration of the resin into the pattern layer, the interfacial adhesion between the pattern layer and the base sheet is decreased. This also brings about deterioration of the quality of decorative plates.

Another problem is that after the pattern layer is transferred onto the base sheet by hot pressing, a substrate of the transfer printing sheet is not always finely separated from the pattern layer. This is because the substrate of the transfer printing sheet and the pattern layer tend to be firmly adhered to each other by the resin penetrated into the pattern layer.

Thermoset-resin surfaced decorative plates require that fiber which composes a base sheet, an adhesive layer and a pattern layer are firmly adhered and joined by an impregnating resin. If not, blisters are formed, or separation between the layers is caused when heat is applied to the decorative plate, for example, when a pan, a pot or the like containing hot water is placed on the decorative plate. Blisters are also formed on such a decorative plate when it is subjected to post-forming in which it is bent with the application of heat.

SUMMARY OF THE INVENTION

In view of the foregoing matters, we have accomplished the present invention. Namely, an object of the present invention is to provide an improved method for producing decorative plates of high quality.

The method for producing decorative plates according to the present invention comprises the steps of (i) providing a transfer printing sheet which comprises (a) a substrate film made from a synthetic resin, (b) a releasing layer formed, optionally, on the substrate film, (c) a pattern layer formed on the substrate film or on the releasing layer if it is provided, and (d) an adhesive layer formed on the pattern layer, (ii) superposing the transfer printing sheet on a base sheet, (iii) hot-pressing the transfer printing sheet and the base sheet, (iv) peeling the substrate film off the transfer printing sheet thereby to transfer the pattern layer onto the base sheet, (v) impregnating the base sheet with a thermosetting resin, and (vi) hot-pressing the resulting base sheet to harden the thermosetting resin to give a decorative plate.

DESCRIPTION OF THE INVENTION

In the present invention, a pattern layer is formed on a base sheet by means of a hot-pressing transfer printing method.

The transfer printing sheet for use in the method of the present invention can be prepared using the following materials.

A synthetic resin film such as of polyester, polyolefin, a vinyl resin, polycarbonate, polyamide, polystyrene, an ethylene-vinylacetate copolymer or the like can be used as a substrate film of the transfer printing sheet.

Among the above-enumerated synthetic resin films, a polyethylene terephthalate film, a polyethylene naphthalate film and a polybutylene terephthalate film are preferred as the polyester films, and a polyethylene film, a polypropylene film and a polymethylpentene film are preferred as the polyolefin films. Further, in the present invention, high quality paper or the like on which a polyolefin layer is formed by means of melt extrusion coating is also employable as the substrate film. The polyolefin layer can serve as a releasing layer.

When a releasing layer which will be described later is further provided on the substrate film, the substrate film can be smoothly separated from the transfer printing sheet after the pattern layer is transferred to the base sheet (i.e., after the hot pressing step).

In the transfer printing sheet of the present invention, a releasing layer is provided, if necessary, on the substrate film so as to improve the releasability between the substrate film and the pattern layer. The releasing layer is prepared using a material which can firmly adhere to the substrate film but can adhere to the pattern layer in such a degree that the releasing layer cannot peel off the pattern layer before the pattern layer is transferred to the base sheet and can be easily separated from the pattern layer at the interface between the pattern layer and the releasing layer after the pattern layer is transferred. Specifically, a mixture of a melamine resin and an acrylic resin is preferred.

The pattern layer can be formed in a known printing manner using a conventional printing ink. It is however preferable that a binder or a vehicle of an ink composition to be used for forming the pattern layer be a mixture of a butyral resin and a melamine resin.

Cellulose resins such as nitrocellulose, cellulose acetate and cellulose acetate propionate, acrylic resins such as polymethylmethacrylate, butyral resins and mixtures thereof can also be used as the vehicle of the printing ink. In particular, a mixture of a cellulose or melamine resin and a butyral resin is preferred because it can improve the permeability of a solution of a melamine resin which is employed as an impregnating resin in the later process. The above resins can be used in both a solvent-soluble ink and an aqueous ink (a water-soluble ink). A pigment, a dye or the like is added to the resin in accordance with a conventional manner to give an ink of desired color.

An adhesive layer plays a particularly important role in the present invention. A resin which is compatible with a thermosetting resin with which the base sheet is impregnated is preferably used for forming the adhesive layer. Specifically, a resin for forming the adhesive layer is selected from an acrylic resin, a vinyl resin, a rubber-like resin, a polyolefin resin, an epoxy resin, an urethane resin, a melamine resin, a butyral resin and the like. Upon selecting the resin, the suitability and compatibility between the resin and an impregnating thermosetting resin, and the permeability and adhesive properties of the resin should be carefully considered. In other words, it is necessary to select the resin so that the adhesive layer transferred to the base sheet will not disturb the penetration of the thermosetting resin into the transfer printing sheet, and that the adhesive layer and the thermosetting resin can firmly be adhered after the thermosetting resin is hardened. Specifically, a mixture of a melamine resin and a butyral resin, in particular, the mixture with a mixing ratio of 4:1 to 1:1 (weight basis) is suitably used as an adhesive agent. The adhesive layer can be formed using the adhesive agent by a known method such as a coating method. Either an organic solvent or water can be used as a solvent of the adhesive agent.

A releasing layer is often provided on top of the conventional transfer printing sheet for the purpose of protecting a pattern layer. However, in the present invention, it is unnecessary to provide such a releasing layer. That is because the releasing layer tends to disturb the penetration of the resin into the base sheet and also decreases the surface glossiness.

In the present invention, a coating layer can be further provided between the pattern layer and the adhesive layer. The substrate film is directly brought into contact with the adhesive layer at a non-printed area of the pattern layer. For this reason, the substrate film cannot be completely separated from the pattern layer after the pattern layer is transferred to the base sheet, and the pattern tends to partially stick to the substrate film. The coating layer provided between the pattern layer and the adhesive layer can serve as a barrier layer and can effectively prevent the above defective separation.

The coating layer can be formed using a coating agent prepared by dissolving a resin in a solvent without incorporating a pigment, which resin is the same as the binder resin of the ink composition used for forming the pattern layer, or prepared, more preferably, by adding an extender pigment such as calcium carbonate, barium carbonate, alumina or silica to the above resin, and diluting the resulting mixture by a solvent. The coating agent is coated onto the entire surface of the adhesive layer to form the coating layer. In the case where the coating layer is formed using a coating agent containing an extender pigment between the substrate film and the pattern layer, it covers the pattern layer after the pattern layer is transferred to the base sheet, becoming a mat layer. As a result, the glossiness of the pattern surface is drastically reduced, or the chroma is decreased due to blushing. It is therefore preferable to provide the coating layer between the pattern layer and the adhesive layer.

Any base sheet which has been used for the conventional decorative plates can be used as the base sheet for use in the present invention. Specific examples of the base sheet include titanium-containing paper, craft paper, tissue paper, cotton cloth, woven or nonwoven cloth of glass fiber or synthetic resin fiber. Of these sheets, titanium-containing paper with a basis weight of 35 to 140 $g/m^2$, in particular, 55 to 100 $g/m^2$, is preferred. This is because the above paper can be fully impregnated with a resin, and an excellent design is readily expressible when the paper is employed as the base sheet.

A thermosetting resin with which the base sheet is impregnated can be selected from resins which have been used for preparing the conventional decorative plates. Of these resins, a melamine resin is favorably used. A hardening agent may be employed together with the thermosetting resin, if necessary.

Hot pressing which is carried out to cause the penetration of the thermosetting resin into the base sheet, for the formation of a sheet, and to harden the resin can be conducted in accordance with a known method adopted in the production of the conventional decorative plates. Specifically, when a melamine resin or a diallylphthalate resin is employed as the thermosetting resin, a base sheet is dipped in a solvent solution of the resin, and then pulled out. After the solvent is vaporized, the base sheet is hot-pressed by a metal mold.

In the case where an unsaturated polyester resin is used as the thermosetting resin, a wet processing method is adopted. Specifically, a solution of the resin is coated onto the surface of the base sheet by means of flow coat or the like. On the base sheet thus impregnated with the resin, an oxygen barrier film such as of vinylon or polyethylene terephthalate is formed, and hardened.

The method for producing thermoset-resin surfaced decorative plates according to the present invention is characterized in that a pattern layer is provided on a base sheet by means of a transfer printing method, instead of a printing method. Since a synthetic resin film having high releasability is used as a substrate film of the transfer printing sheet, decorative plates which are free from non-printed portions in a pattern-printed area and have a beautiful appearance can be produced.

Furthermore, in the present invention, the adhesive layer is formed using a resin or a composition containing the resin which is highly compatible with an impregnating thermosetting resin. Therefore, the adhesion between the transfer printing sheet and the base sheet is enhanced, and thorough penetration of the thermosetting resin into the transfer printing sheet is ensured. In addition, the impregnating resin is compatible with both the adhesive layer and the pattern layer, so that it can thoroughly penetrate into the layers and can firmly adhere them to each other. Therefore, a decorative plate which scarcely produces blisters when heat is applied thereto can be obtained.

When a releasing layer is provided using a mixture of a melamine resin and an acrylic resin, a transfer printing sheet which can ensure smooth separation between a substrate film and a pattern layer can be obtained. Further, when an adhesive layer is formed using a mixture of a butyral resin and a melamine resin, and, at the same time, a melamine resin is employed as an impregnating thermosetting resin, the adhesive layer does not disturb the penetration of the melamine resin into the base sheet. A decorative plate of high quality can thus be obtained.

As described above, a decorative plate in which a pattern layer, an adhesive layer and a base sheet are firmly joined by a thermosetting resin uniformly penetrated into them can be obtained by the method of the present invention. The decorative plate is excellent in that blisters are scarcely produced even when the plate is partially heated.

The decorative plates obtainable by the method according to the present invention are suitable for interior use materials such as wall materials and flooring materials, and also for decoration materials used for household furnitures and kitchen fitments.

The present invention will now be explained more specifically referring to Examples. However, the following Examples should not be construed as limiting the present invention.

EXAMPLE 1

A printing ink and an adhesive agent having the following formulations were respectively prepared. It is noted that a 50:30:20 (weight basis) mixed solvent of toluene, isopropyl alcohol and ethylacetate was used as a solvent of the printing ink and of the adhesive agent.

| | |
|---|---|
| **Printing Ink:** | |
| Butyral resin | 5% by weight |
| Melamine resin | 5% by weight |
| Coloring pigment | 20% by weight |
| Solvent | 70% by weight |
| **Adhesive Agent:** | |
| Butyral resin | 10% by weight |
| Melamine resin | 10% by weight |
| Solvent | 80% by weight |

A releasing agent, a 1:1 (weight basis) mixture of a melamine resin and an acrylic resin, was coated onto a substrate film with a thickness of 25 μm, a polyethylene terephthalate film "S Type" (Trademark) manufactured by Toray Industries, Inc., and was heated to a temperature of 180° C. The releasing agent was thus hardened to give a releasing layer.

On the releasing layer formed on the substrate film, a grain pattern was printed by gravure coating using the above-prepared printing ink. The above-prepared adhesive agent was then coated onto the printed surface by a roller, whereby a transfer printing sheet was obtained.

Base paper for decorative plates, "KW-80" (Trademark) manufactured by Kohjin Co., Ltd., having a basis weight of 80 $g/m^2$ was used as a base sheet. The transfer printing sheet was superposed on the base paper, and then they were pressed by a metal roller heated to a temperature of 150° C. The pattern printed on the transfer printing sheet was thus transferred to the base paper.

The pattern-bearing base paper was impregnated with a solvent solution of a melamine resin. After the solvent was vaporized, the base paper was subjected to hot pressing, thereby obtaining a decorative plate. The decorative plate thus obtained was found to have high quality, that is, the melamine resin was uniformly penetrated into the plate, and all the layers contained therein were firmly joined.

EXAMPLE 2

A printing ink, a coating agent and an adhesive agent having the following formulations were respectively prepared. It is noted that a 50:30:20 (weight basis) mixed solvent of toluene, isopropyl alcohol and ethylacetate was used as a solvent of the printing ink, of the coating agent and of the adhesive agent.

| | |
|---|---|
| **Printing Ink:** | |
| Modified cellulose resin (to improve the permeability of resin) | 10% by weight |
| Melamine resin | 0.5% by weight |
| Anti-settling agent | 20% by weight |
| Coloring pigment | 10% by weight |
| Solvent | 59.5% by weight |
| **Coating Agent:** | |
| Modified cellulose resin | 10% by weight |
| Melamine resin | 0.5% by weight |
| Anti-settling agent | 20% by weight |
| Extender pigment ($CaCO_3$) | 10% by weight |
| Solvent | 59.5% by weight |
| **Adhesive Agent:** | |
| Extender pigment (anti-blocking agent) | 1.5% by weight |
| Butyral resin | 10% by weight |
| Melamine resin | 5% by weight |
| Plasticizer | 5% by weight |
| Solvent | 78.5% by weight |

A releasing agent, a 1:1 (weight basis) mixture of a melamine resin and an acrylic resin, was coated onto a substrate film with a thickness of 25 μm, a polyethylene terephthalate film "S Type" (Trademark) manufactured by Toray Industries, Inc., in an amount of 2 $g/m^2$ on dry basis by means of gravure coating, and was heated to a temperature of 180° C. The releasing agent was thus hardened to give a releasing layer.

On the releasing layer formed on the substrate film, a grain pattern was printed by gravure printing using the above-prepared printing ink. The above-prepared coating agent was then coated onto the printed surface in an amount of 2 $g/m^2$ on dry basis by a gravure coater, and the adhesive agent was coated thereon in an amount of 2 $g/m^2$ on dry basis by a gravure roll coater. Thus, a transfer printing sheet was obtained.

Base paper for decorative plates, "KW-80" (Trademark) manufactured by Kohjin Co., Ltd., having a basis weight of 80 $g/m^2$ was used as a base sheet. The transfer printing sheet was superposed on the base paper, and then they were pressed by a metal roller heated to a temperature of 150° C. The pattern printed on the transfer printing sheet was thus transferred to the base paper.

The pattern-bearing base paper was then impregnated with a solvent solution of a melamine resin. After the solvent was vaporized, the base paper was subjected to hot pressing, thereby obtaining a decorative plate. The decorative plate thus obtained was found to have high quality, that is, the melamine resin was uniformly penetrated into the plate, and all the layers contained therein were firmly joined.

What is claimed is:

1. A method for producing decorative plates, comprising the steps of:

providing a transfer printing sheet which comprises (a) a substrate film comprising a synthetic resin, (b) a releasing layer formed, optionally, on the substrate film, the releasing layer comprising a mixture of an acrylic resin and a melamine resin, (c) a pattern layer formed on the substrate film or on the releasing layer if it is provided and (d) an adhesive layer formed on the pattern layer, the adhesive layer comprising a mixture of a butyral resin and a melamine resin;

superposing the transfer printing sheet on a base sheet;

hot-pressing the transfer printing sheet and the base sheet;

peeling the substrate film off the transfer printing sheet thereby to transfer the pattern layer onto the base sheet;

thereafter impregnating the base sheet with a melamine resin; and subsequent to said impregnating step, hot-pressing the resulting base sheet to harden said melamine resin to give a decorative plate.

2. The method according to claim 1, wherein a coating layer is further provided between the pattern layer and the adhesive layer.

3. The method according to claim 1, wherein the pattern layer is formed using an ink composition which comprises as a vehicle or a binder a mixture of a butyral resin and a melamine resin.

4. The method according to claim 1, wherein the pattern layer is formed using an ink composition which comprises as a vehicle or a binder a cellulose resin.

* * * * *